US012738595B2

(12) United States Patent
Fronemann

(10) Patent No.: US 12,738,595 B2
(45) Date of Patent: Sep. 15, 2026

(54) BATTERY HOUSING FOR AN ENERGY STORAGE DEVICE, ENERGY STORAGE DEVICE FOR A MOTOR VEHICLE, AND METHOD FOR DISCHARGING A GAS-PARTICLE MIXTURE FROM A BATTERY HOUSING

(71) Applicant: AUDI AG, Ingolstadt (DE)

(72) Inventor: Jens Fronemann, Simmelsdorf (DE)

(73) Assignee: AUDI AG, Ingolstadt (DE)

(*) Notice: Subject to any disclaimer, the term of this patent is extended or adjusted under 35 U.S.C. 154(b) by 406 days.

(21) Appl. No.: 18/153,544

(22) Filed: Jan. 12, 2023

(65) Prior Publication Data

US 2023/0253672 A1 Aug. 10, 2023

(30) Foreign Application Priority Data

Feb. 7, 2022 (DE) ......................... 102022102826.7

(51) Int. Cl.
*B01D 45/00* (2006.01)
*B01D 45/08* (2006.01)
(Continued)

(52) U.S. Cl.
CPC .......... *H01M 50/367* (2021.01); *B01D 45/08* (2013.01); *B60L 50/64* (2019.02); *B60L 58/26* (2019.02);
(Continued)

(58) Field of Classification Search
CPC ............. H01M 50/367; H01M 10/613; H01M 10/6566; H01M 50/317; H01M 2220/20;
(Continued)

(56) References Cited

U.S. PATENT DOCUMENTS

2004/0025483 A1* 2/2004 Norman ................. B01D 45/06 55/444
2004/0086778 A1 5/2004 Nakano et al.
(Continued)

FOREIGN PATENT DOCUMENTS

DE 102013204585 A1 * 9/2014 .......... H01M 50/317
DE 102019114047 A1 12/2020
(Continued)

OTHER PUBLICATIONS

Search Report issued on Oct. 17, 2022, in corresponding German Application No. 102022102826.7, 16 pages.

*Primary Examiner* — T. Bennett Mckenzie
(74) *Attorney, Agent, or Firm* — Maier & Maier, PLLC

(57) ABSTRACT

A battery housing for an energy storage device, the battery housing has a receiving area for accommodating a battery unit. In this case, a gas discharge channel is integrated into the battery housing, which gas discharge channel has an interior space that is spatially delimited by a channel wall. At least one gas inlet opening and at least one gas outlet opening leading out of the battery housing are arranged in the channel wall. A gas discharge path is provided from the at least one gas inlet opening to the at least one gas outlet opening. At least one part of the channel wall is designed as a cooling device for cooling a gas-particle mixture flowing through the gas discharge channel.

2 Claims, 3 Drawing Sheets

(51) Int. Cl.

| | |
|---|---|
| ***B60L 50/64*** | (2019.01) |
| ***B60L 58/26*** | (2019.01) |
| ***H01M 10/613*** | (2014.01) |
| ***H01M 10/6566*** | (2014.01) |
| ***H01M 50/367*** | (2021.01) |
| *H01M 50/35* | (2021.01) |
| *H01M 50/383* | (2021.01) |

(52) U.S. Cl.
CPC ..... *H01M 10/613* (2015.04); *H01M 10/6566* (2015.04); *H01M 50/35* (2021.01); *H01M 50/383* (2021.01)

(58) Field of Classification Search
CPC ........... H01M 10/625; H01M 10/6556; H01M 10/6563; H01M 50/209; H01M 50/249; H01M 10/6567; B01D 45/08; B60L 50/64; B60L 58/26; Y02E 60/10
USPC ........................................................... 95/267
See application file for complete search history.

(56) References Cited

U.S. PATENT DOCUMENTS

| | | | | |
|---|---|---|---|---|
| 2008/0236116 | A1* | 10/2008 | Kawasaki | B01D 45/06 55/385.4 |
| 2017/0237055 | A1* | 8/2017 | Shimizu | H01M 50/308 429/53 |
| 2021/0066690 | A1 | 3/2021 | Gondoh | |
| 2021/0313650 | A1* | 10/2021 | Gondoh | H01M 50/35 |
| 2023/0019147 | A1* | 1/2023 | Geisler | H01M 10/0525 |
| 2023/0163407 | A1* | 5/2023 | Huntsman | H01M 50/394 429/53 |
| 2023/0246289 | A1* | 8/2023 | Pröll | B60L 50/64 429/82 |

FOREIGN PATENT DOCUMENTS

| | | | | |
|---|---|---|---|---|
| DE | 102021100659 | A1 | 3/2021 | |
| DE | 102020125971 | A1 | 4/2022 | |
| DE | 102021102908 | A1 | 8/2022 | |
| EP | 0189543 | B1 | 8/1991 | |
| WO | WO-2020039722 | A1 * | 2/2020 | H01M 50/204 |
| WO | 2021089574 | A1 | 5/2021 | |

* cited by examiner

BATTERY HOUSING FOR AN ENERGY STORAGE DEVICE, ENERGY STORAGE DEVICE FOR A MOTOR VEHICLE, AND METHOD FOR DISCHARGING A GAS-PARTICLE MIXTURE FROM A BATTERY HOUSING

FIELD

The invention relates to a battery housing for an energy storage device, wherein the battery housing has a receiving area for accommodating a battery unit. Furthermore, the invention also relates to an energy storage device for a motor vehicle and a method for discharging a gas-particle mixture exiting a battery unit from a battery housing.

BACKGROUND

A defective battery cell can lead to thermal runaway in a battery or battery module. A large amount of gas enriched with very hot particles escapes in this process, which is also known as venting, wherein this gas-particle mixture should be guided out of the battery in a controlled manner. The venting gas, which is also referred to here as a gas-particle mixture, consists predominantly of combustible components, in particular combustible components combined with oxygen.

If the venting gas escapes from the battery compartment into the environment, the venting gas may ignite due to the very hot, entrained particles and the mixing with the oxygen in the air. As a result, other parts and components located in the area of the venting gas outlet can catch on fire.

DE 10 2013 204 585 A1 describes a battery pack, wherein a special free space is provided in a battery pack housing for degassing, in which an individual battery cell releases gas from its interior space, for example due to overcharging or thermal overload, via an overpressure mechanism, into which free space the released gas can expand, thereby reducing the temperature and pressure thereof. The gas is then released from inside the battery pack housing to the outside through a pressure relief device. The gas flows through a particle separation device provided in the overpressure release device, for example in the form of a cyclone separator or a surface filter with a fiber composite or an open-pored, spongy structure. Particles contained in the gas, such as graphite dust, for example, can be filtered out when flowing through the particle separation device, in order to prevent explosive concentrations within the exiting gas, for example.

However, these measures take up a relatively large amount of installation space.

Furthermore, DE 10 2019 114 047 A1 describes a storage module for storing electrical energy, which storage module has a housing which encloses an electrochemical storage cell. In this case, the storage module comprises a degassing line which is arranged on the housing and extends outside of the housing, which degassing line is designed to discharge exhaust gases from the interior space of the housing into the area surrounding the storage module, cooling the exhaust gases down in the process. The storage module can comprise a cooling unit in order to actively cool the degassing line.

This measure also requires a large amount of additional installation space.

Furthermore, EP 0 189 543 B1 describes a battery in a block box, the individual cells of the block box degassing via a common gas channel leading to the outside through the block box cover, wherein the collected gas passes through flame protection devices before it escapes to the outside. In this case, in particular, two interior spaces are provided, of which the first contains means for acid separation and the last contains a flameproofing device against which the dehumidified gas flows.

Nevertheless, it would be desirable to further increase the efficiency in rendering venting gases harmless, in particular in a way that saves as much space as possible.

SUMMARY

The object of the present invention is therefore to provide a battery housing, an energy storage device, and a method that enable gas exiting a battery unit to be discharged from the battery housing as efficiently and safely as possible, and this in the most space-saving manner possible.

This object is achieved by a battery housing, an energy storage device, and a method. Advantageous embodiments of the invention are the subject matter of the description and the figures.

A battery housing according to the invention for an energy storage device has a receiving area for accommodating a battery unit. In this case, a gas discharge channel is integrated into the battery housing, which gas discharge channel has an interior space that is spatially delimited by a channel wall. At least one gas inlet opening and at least one gas outlet opening leading out of the battery housing are arranged in the channel wall, and a gas discharge path is provided from the at least one gas inlet opening to the at least one gas outlet opening. Furthermore, at least one part of the channel wall is designed as a cooling device for cooling a gas-particle mixture flowing through the gas discharge channel, and the gas discharge channel has at least one particle separation device for separating particles from the gas-particle mixture flowing through the gas discharge channel.

The invention provides an actively coolable particle separation device, so to speak, which is integrated into the battery housing. Numerous major advantages result precisely from the combination of an active cooling device with the at least one particle separation device. The invention is based on the finding that particle separation causes the corresponding gas-particle mixture to slow down in terms of its flow rate or that mechanisms that lead to a slowdown of the gas-particle mixture can be used for particle separation. This in turn means that the gas-particle mixture stays longer in the gas discharge channel when flowing through it, which in turn enormously increases the cooling efficiency of the cooling device which cools the gas-particle mixture flowing through the gas discharge channel. The synergistic interaction of cooling and particle separation makes it possible for the venting gas ultimately exiting the at least one gas outlet opening to contain no or hardly any particles and also to be enormously cooled in an especially efficient and space-saving manner, so that the probability of self-ignition is reduced to a minimum when the gas escapes into the environment. The efficiency of this gas discharge can also be increased enormously by integrating the gas discharge channel into the battery housing. There are several reasons for this. For one thing, for example, the battery housing for cooling a battery unit accommodated in the battery housing can also be used as a cooling device for the gas discharge channel, so that this in turn saves components and installation space. Above all, however, this makes it possible to cool the venting gas shortly after it exits the battery unit. This can prevent a build-up of heat and also negative effects on other battery units that are still intact. In other words, thermal runaway to other battery units can be prevented or at least delayed much more efficiently. Thus, overall, the invention makes it possible to provide an especially efficient and safe and simultaneously space-saving gas discharge of a venting gas from a battery housing.

The battery housing can represent a battery housing for a motor vehicle battery, preferably for a high-voltage battery. The battery unit, which can be accommodated in the battery housing, can be, for example, a single battery cell, for example a lithium-ion cell, or a battery module or a cell stack with several such battery cells. The battery housing can also be designed to accommodate several such battery units, in particular several battery cells or several battery modules, each with several battery cells. For this purpose, the battery housing can also have several receiving areas for accommodating one battery unit each. Several such gas discharge channels can also be arranged in the battery housing, for example on different sides of the one or more receiving areas. In addition, the gas discharge channel is preferably arranged in an edge region of the battery housing. This facilitates the gas discharge to the outside and the spatial and thermal separation of the battery cells that can be accommodated in the battery housing in the accommodated state. The battery housing can, for example, be essentially box-shaped, that is to say cuboid. The interior space of the battery housing can be divided, for example, into a first area, in which the receiving areas for the battery units are provided, and a second area, in which the gas discharge channel is arranged. The second area is to be provided significantly smaller than the first area, in particular by orders of magnitude. The two areas can be separated, for example, by a dividing wall in which the at least one gas inlet opening is arranged. In addition, if the battery housing has several receiving areas, it can also have several such dividing walls which separate the individual receiving areas from one another, at least in regions. For example, the battery housing can be designed as an aluminum die-cast component. Accordingly, it is preferred that the channel wall of the gas discharge channel is also made of a metallic material, for example aluminum. This has the great advantage that the heat from the particle-gas mixture can be absorbed and dissipated very quickly. In this case, the particle separation device itself can also be regarded as part of the channel wall. In particular, any surface with which the gas-particle mixture can come into contact when flowing through the gas discharge channel along the gas discharge path can be regarded as a channel wall. The part of the channel wall that is designed as a cooling device can therefore also flow against or make contact with the gas-particle mixture flowing through the gas discharge channel. This allows the gas-particle mixture to be cooled especially efficiently. The cooling device is preferably designed as an active cooling device. A coolant, for example water, can therefore be used to cool the at least one part of the channel wall.

It is therefore a further very advantageous embodiment of the invention if the at least one part of the channel wall is designed so that a coolant can flow through it. The at least one part of the channel wall can therefore have one or more cooling channels through which such a coolant can flow. The coolant is preferably a water-based coolant, which can also be used, for example, to cool the battery unit if it is accommodated in the battery housing as intended and the energy storage device provided in this way is operated in a motor vehicle as intended. Such active cooling allows significantly more heat to be dissipated and the gas-particle mixture to be cooled significantly more efficiently than, for example, simple expansion cooling or the like. Furthermore, it is conceivable that only one part of the channel wall or some parts of the channel wall that delimit the interior space of the gas discharge channel are also designed so that a coolant can flow through them. In principle, however, it is also possible for a coolant to flow through the entire channel wall.

The cooling device can only become active, for example, when the escape of a gas-particle mixture, which is also simply referred to below as gas or venting gas, is detected as a battery unit accommodated in the battery housing. If the cooling device is also simultaneously used to cool or control the temperature of one of the battery units during normal operation, it may be that the cooling device is already active before a venting gas escapes from the battery unit and therefore no longer has to be activated separately. Activation of the cooling device should be understood to mean at least the activation of a coolant pump, which can be powered, for example, via a low-voltage network of a motor vehicle in which the invention is used. It is also possible for the coolant to be actively cooled via a coolant circuit, at least if this is still possible in this case despite the defect in the energy storage device.

In a further very advantageous embodiment of the invention, the battery housing has a dividing wall which separates the receiving area from the interior space of the gas discharge channel, wherein the dividing wall provides the at least one part of the channel wall through which a coolant can flow. This represents an especially advantageous embodiment of the invention, since the dividing wall, which now represents the cooling device, can not only be used to cool the gas-particle mixture that flows through the gas discharge channel, but also to cool the battery unit accommodated in the receiving area. In normal operation, therefore, the cooling device for cooling the gas-particle mixture flowing through the gas discharge channel does not remain unused. Another major advantage is that this actively cooled dividing wall provides especially good thermal decoupling of the hot gas-particle mixture from the receiving area or areas and thus from the battery units arranged in the receiving areas. Above all, this has an especially advantageous effect on battery units that are still intact and accommodated in the battery housing. In this way, thermal runaway of a battery unit which spreads to other battery units can be prevented or at least delayed much more efficiently.

In a further very advantageous embodiment of the invention, at least one part of the particle separation device is designed so that the coolant can flow through it, in particular wherein the at least one part of the particle separation device is provided by the at least one part of the channel wall designed as a cooling device. It is thus advantageously possible to design the particle separation device itself as an active cooling device. This also makes particle separation even more efficient. Cooling the gas-particle mixture also extracts energy from the particles contained in the gas-particle mixture and slows them down, making separation easier.

The particle separation device can generally take on different forms. For example, it can be designed as a particle filter with a filter material and/or as a centrifuge or cyclone separator. In addition, the gas discharge channel can also comprise several different particle separation devices of this type. Such a particle separation device can also be provided, for example, in that the gas discharge path from the at least one gas inlet opening to the at least one gas outlet opening does not extend in a straight line, but rather has numerous turns and deflections.

It has proven to be especially advantageous, as is provided according to a further very advantageous embodiment of the invention, if the at least one particle separation device has baffle plates provided by the channel wall and protruding into the interior space of the gas discharge channel, which divide the interior space of the gas discharge channel into individual segments along the gas discharge path, wherein each pair of segments arranged adjacent each other along the gas discharge path are fluidly coupled to one another through a passage opening in the respective baffle plate. These baffle plates therefore cause a local reduction in the flow cross-section of the gas discharge channel. A large part of the gas-particle mixture flowing along the gas discharge path thus impacts these baffle plates and is slowed down and swirled as a result. This swirling leads to a further deceleration of the gas flow. The impact on the baffle plates and the deceleration of the gas flow means that particles contained in the gas flow are deposited on these baffle plates. Each time the gas flow passes through a passage opening of such a baffle plate and a corresponding segment, further particles are thus gradually separated and the gas flow is increasingly slowed down. The deceleration also results in a cooling of the gas flow, that is to say also independently of the additionally provided active cooling of the channel wall. As a result, especially efficient cooling and particle separation of the venting gas can be achieved.

As already defined above, the baffle plates also represent one part of the channel wall of the discharge channel. Correspondingly, the above-mentioned part of the channel wall, which is designed as a cooling device, can also be these baffle plates. However, this does not necessarily have to be the case.

In a further very advantageous embodiment of the invention, a respective passage opening is located in an upper half of a respective baffle plate with respect to a first direction. The first direction is preferably defined in such a way that it is aligned parallel to a vertical direction of the vehicle when the battery housing is arranged in a motor vehicle as intended. The fact that the respective passage openings in the respective baffle plates are then arranged accordingly in the upper half of a respective baffle plate has the great advantage that particles separated on the baffle plates usually sink downwards due to the force of gravity. However, this does not inhibit the flow through the baffle plates or the passage openings thereof, since they are located in the upper half of a respective baffle plate. In other words, the passage openings cannot then become clogged and blocked by particles which are deposited and separated out.

According to a further advantageous embodiment of the invention, the gas discharge channel has, at least in regions, a longitudinal extension in a second direction which is perpendicular to the first direction, and wherein a third direction is defined perpendicular to the first and second direction. The passage openings of two baffle plates which are adjacent in the second direction are arranged offset in relation to one another in the third direction. In other words, the passage openings of two baffle plates which are adjacent in the second direction are not arranged concentrically with one another, that is to say they are not aligned. This has the advantage that it is not possible for the gas-particle mixture to flow through the passage openings in a straight line in the second direction. The gas flow has to be deflected beforehand in order to flow through the passage opening that is closest in the second direction. This in turn promotes particle separation and cooling of the venting gas.

The gas discharge channel itself can also be designed with multiple windings and extend, for example, in the second direction, and then be deflected in such a way that it extends further opposite the second direction, and so on. The gas discharge channel can therefore extend in a serpentine manner with respect to its main extension direction, and the gas discharge path can again extend in a serpentine manner separately within the gas discharge channel. In the deflection areas of the gas discharge channel, the channel extends not only in the second direction, but also partly in the third direction. In general, it can therefore be provided that the passage openings of two baffle plates which are adjacent in the longitudinal direction of the gas discharge channel are arranged offset to one another in a direction perpendicular to this longitudinal direction, regardless of whether the longitudinal direction currently points in the second direction or not or e.g. in the third direction.

In a further, very advantageous embodiment of the invention, the baffle plates are at least partly arranged at an angle other than 90 degrees with respect to the second and third direction. In general, a baffle plate does not necessarily have to be flat, but rather a baffle plate can be angled. At least one part of such a baffle plate is therefore preferably oriented neither perpendicular to the second direction nor perpendicular to the third direction. This relates in particular to baffle plates which are arranged in a part of the gas discharge channel which extends in the second direction.

It has been shown that this angled design and arrangement of the baffle plates allows the venting gas flowing through the gas discharge channel to be especially strongly swirled. Such swirling has an effect similar to that of a cyclone separator, for example. Due to the resulting centrifugal forces, particles contained in the venting gas are flung outwards and separated. The efficiency of the particle separation can thus be additionally increased in this way.

The design of the at least one particle separation device as such baffle plates can also be combined with other particle separation devices, for example with one or more of the above-mentioned cyclone separators.

Furthermore, the invention also relates to an energy storage device for a motor vehicle having a battery housing according to the invention or one of the embodiments thereof.

The energy storage device is preferably designed as a high-voltage battery. In addition to the battery housing, such an energy storage device preferably comprises at least one battery unit, which is accommodated in the receiving area of the battery housing. The battery housing preferably comprises several receiving areas, in each of which a battery unit can be arranged. In other words, it is preferred that the energy storage device comprises several energy units. The battery units can be battery cells or battery modules, which in turn each comprise several battery cells. The battery cells can be formed as prismatic cells, pouch cells, or round cells. In addition, the battery cells can be formed, for example, as lithium-ion cells.

Furthermore, a motor vehicle having an energy storage device according to the invention or one of the embodiments thereof should also be regarded as part of the invention. The motor vehicle can be designed as a purely battery-powered electric vehicle or as a hybrid vehicle.

The motor vehicle according to the invention is preferably embodied as an automobile, in particular as a passenger car or truck, or as a passenger bus or motorcycle.

Furthermore, the invention relates to a method for discharging a gas-particle mixture exiting a battery unit from a battery housing which has a receiving area in which the battery unit is accommodated. In this case, a gas discharge channel is integrated into the battery housing, which gas discharge channel has an interior space that is spatially delimited by a channel wall, wherein the gas-particle mixture exiting the battery unit is fed to the gas discharge channel through at least one gas inlet opening in the channel wall and conducted along a gas discharge path to at least one gas outlet opening leading out of the battery housing, wherein the gas-particle mixture flowing through the gas discharge channel is cooled by at least one part of the channel wall designed as a cooling device, and particles are separated out of the gas-particle mixture flowing through the gas discharge channel by means of a particle separation device of the gas discharge channel.

In this case as well, the advantages described in conjunction with the battery housing according to the invention and the embodiments thereof also apply in the same manner to the method according to the invention.

The invention also includes refinements of the method according to the invention, which have features as have already been described in conjunction with the refinements of the battery housing according to the invention. For this reason, the corresponding refinements of the method according to the invention are not described again here.

The invention also comprises combinations of the features of the described embodiments. The invention also comprises implementations which each have a combination of the features of several of the described embodiments, unless the embodiments were described as being mutually exclusive.

BRIEF DESCRIPTION OF THE FIGURES

Exemplary embodiments of the invention are described hereinafter. In the figures.

DETAILED DESCRIPTION

Figure 1:
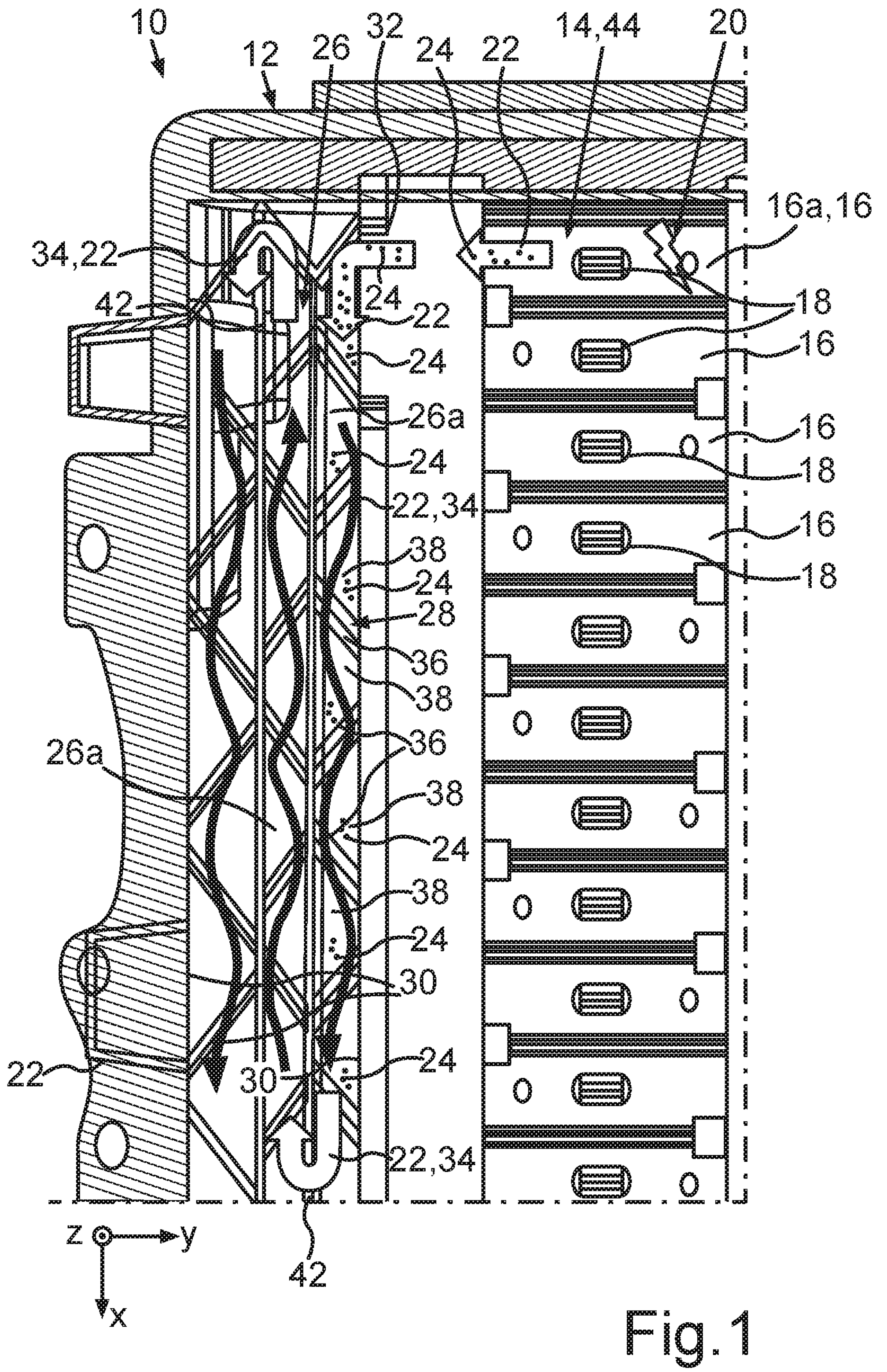
FIG. 1 shows a schematic illustration of a part of a high-voltage battery having a battery housing in a plan view according to an exemplary embodiment of the invention.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those shown. Furthermore, the described embodiments can also be supplemented by further features of the invention as already described.

In the figures, the same reference numerals respectively designate elements that have the same function.

FIG. 1 shows a schematic illustration of a part of a high-voltage battery 10 having a battery housing 12 according to an exemplary embodiment of the invention. In the present case, the battery housing 12 is manufactured as a battery box, for example as an aluminum die-cast housing. The high-voltage battery 10 in turn comprises several battery modules 14, of which only a part of such a battery module is shown in FIG. 1. In this case, such a battery module 14 comprises several battery cells 16, only some of which being provided with a reference numeral in FIG. 1 for reasons of clarity. The battery cells 16 are designed as prismatic battery cells in this example. In this case, the high-voltage battery 10 is preferably arranged in a motor vehicle in such a way that the z-direction shown here points in the direction of a vehicle vertical axis. Correspondingly, the illustration in FIG. 1 shows a view of the upper side of the respective battery cells 16. The respective battery cells 16 also each have a degassing opening 18 on this upper side. This opening is normally closed and is released when a battery cell degasses. For example, such a degassing opening 18 can be designed as a bursting membrane or the like. In the event of a cell defect, thermal runaway of such a cell 16 can occur. Such a thermal runaway 20 is shown in FIG. 1 as an example of a first cell 16*a* of the battery cells 16 of the high-voltage battery 10. In this case, a very hot gas-particle mixture 22 is escaping from the cell 16*a*. This gas-particle mixture 22 is also referred to below as venting gas 22. This venting gas 22 therefore comprises hot particles 24.

In conventional batteries, if such a venting gas escapes from the battery compartment into the environment, the venting gas may ignite due to the very hot, entrained particles and the mixing with the oxygen in the air. As a result, other parts and components located in the area of the venting gas outlet can catch on fire.

This can now advantageously be prevented or the risk of this at least enormously reduced by integrating a gas discharge channel 26 into the battery housing 12, which gas discharge channel has a particle separation device 28 and which can also be actively cooled. The gas discharge channel 26 has an interior space 26*a* which is spatially delimited by a channel wall 30. The channel wall 30 thus includes any surface of the gas discharge channel 26 that can come into contact with the venting gas 22 conducted through the gas discharge channel 26. The gas discharge channel 26 has at least one inlet opening 32 through which the venting gas 22 exiting the defective battery cell 16*a* can enter the gas discharge channel 26. Furthermore, in the present example, the gas discharge channel 26 also has an outlet opening, not shown in detail, from which the venting gas 22 can exit the battery housing 12 after passing through the gas discharge channel 26. The venting gas 22 is guided along a gas discharge path 34 as it passes through the gas discharge channel 26. The arrows shown in FIG. 1 thus illustrate the venting gas 22 and the gas discharge path 34 in the same way. Guidance of the venting gas 22 along this gas discharge path 34 is constrained by the geometric design of the gas discharge channel 26.

At least one part of the channel wall 30 in this case is designed as a cooling device. In particular, at least one part of this channel wall 30 is formed with cooling channels through which a coolant can flow. As a result, the venting gas 22 guided through the gas discharge channel 26 can be cooled especially efficiently. As already mentioned, the gas discharge channel 26 also comprises a particle separation device 28. In this example, the particle separation device is designed as several baffle plates 36. These baffle plates 36 divide the gas discharge channel 26 into several segments 38. For reasons of clarity, only some of these are provided with a reference numeral in FIG. 1. A respective baffle plate 36 in this case has a passage opening through which the venting gas 22 flowing in the gas discharge channel 26 can pass. Such an opening thus fluidly connects two adjacently arranged segments 38 of the gas discharge channel 26 to one another.

Figures 2, 3:
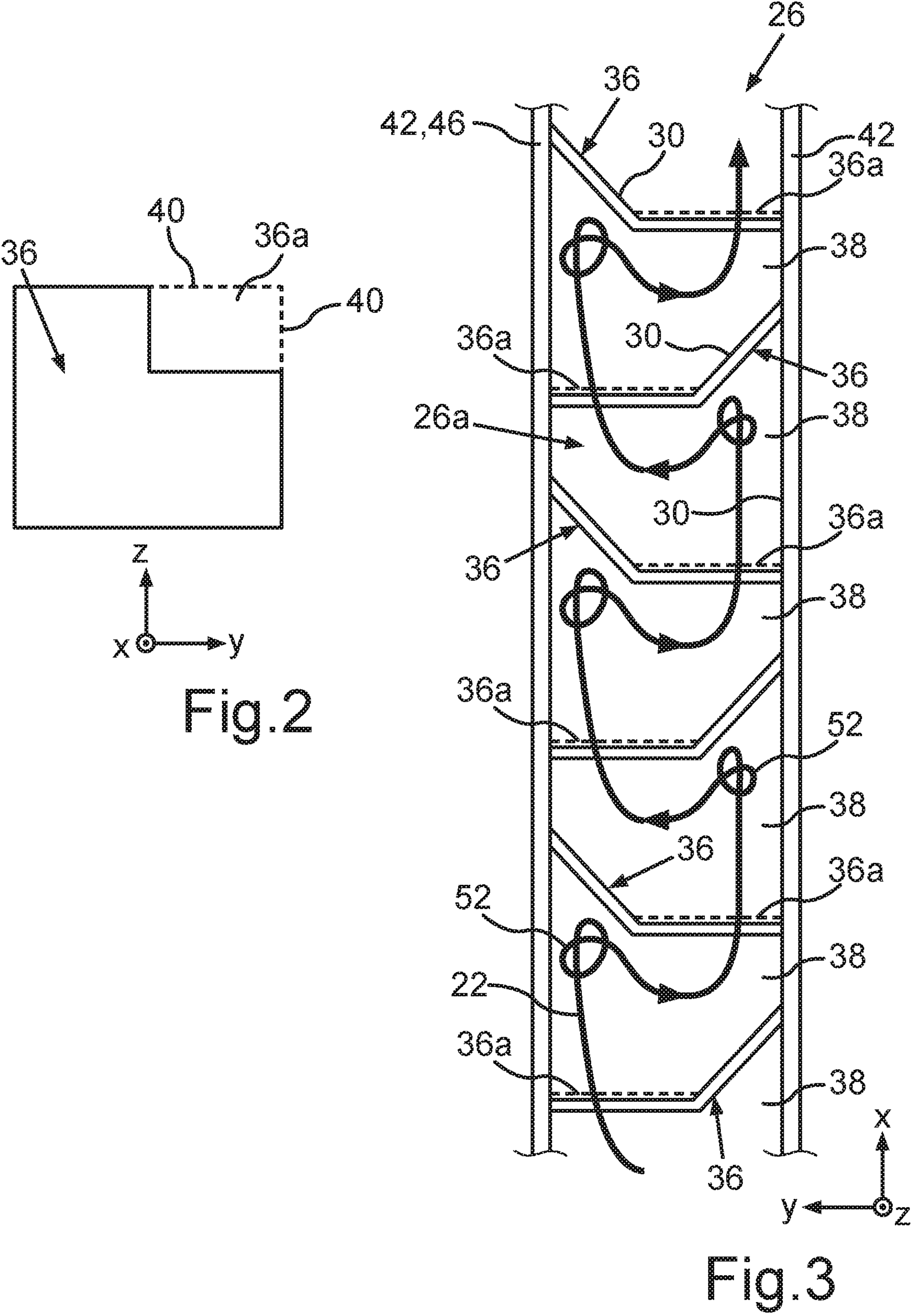
FIG. 2 shows a schematic illustration of a baffle plate of a particle separation device for a battery housing according to an exemplary embodiment of the invention.
FIG. 3 shows a schematic illustration of a part of a gas discharge channel of a battery housing in a plan view according to an exemplary embodiment of the invention.

FIG. 2 once again shows a schematic illustration of such a baffle plate 36 in a plan view, i.e. perpendicular to the x-direction shown here. In the present example, the x-direction also corresponds to the main extension direction of the gas discharge channel 26, which, as shown in FIG. 1, extends in and counter to the x-direction and is also deflected several times. As can be seen in FIG. 2, such a baffle plate 36 has a passage opening 36*a* through which the venting gas 22 (cf. FIG. 1) can pass. The dashed lines 40 in FIG. 2 indicate upward and lateral delimitations of the passage opening 36*a*, which are provided by parts of the wall 30 of the gas discharge channel 26, for example by a top cover of the battery housing 12 and by a lateral dividing wall 42 (cf. FIG. 1). As is also shown in FIG. 1, such dividing walls 42 separate the individual segments 38 of the gas discharge channel 26 from one another in the y-direction and also the gas discharge channel 26 from the adjacent receiving area 44 in which the battery module 14 is accommodated. This can also be seen in FIG. 4, for example.

Figure 4:
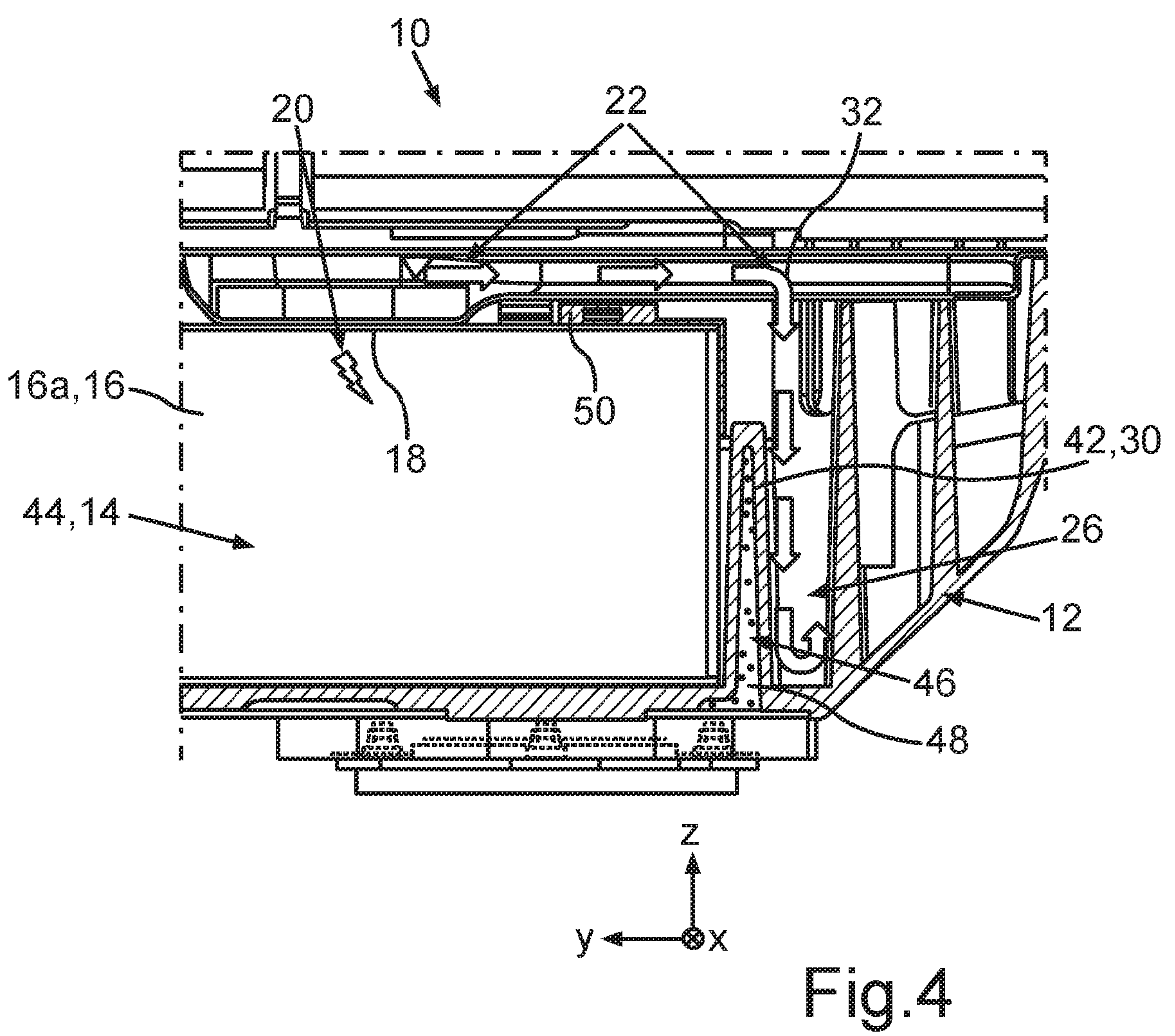
FIG. 4 shows a schematic cross-sectional illustration of the high-voltage battery from FIG. 1 according to an exemplary embodiment of the invention.

FIG. 4 shows a schematic cross-sectional illustration of a cross-section of the energy storage device 10 from FIG. 1 perpendicular to the x-direction. This dividing wall 42 between the receiving area 44, in which the battery module 14 is arranged, and the gas discharge channel 26 is embodied as the cooling device 46 in the present example, and a coolant 48, for example water or a mixture of water and antifreeze, can flow or flows through it. At the same time, this dividing wall 42 also represents one part of the wall 30 of the gas discharge channel 26. This actively cooled dividing wall 42 advantageously takes on a dual function. On the one hand, this dividing wall can be used for cooling the venting gas 22 which flows through the gas discharge channel 26, but also for cooling and temperature control of the battery module 14 during normal operation at the same time. FIG. 4 also shows, moreover, a pole 50 or a terminal 50 of the battery cell 16*a*. The venting gas 22 is routed from the degassing opening 18 of the battery cell 16*a* to the inlet opening 32 of the gas discharge channel 26 in such a way that the venting gas is separated from the pole terminal 50. This can be done in that the venting gas 22 is immediately introduced into a separated spatial region after exiting the degassing opening 18, the spatial region being separated in particular from the cell poles 50.

As can also be seen in FIG. 2, the passage openings 36*a* in the respective baffle plates 36 are arranged in the upper half of such a baffle plate 36. When the venting gas 22 strikes such a baffle plate 36, it is slowed down and the particles 24 contained in the venting gas 22 (cf. FIG. 1) are separated out as a result. Due to the force of gravity, these particles collect in the base area, as is also illustrated in FIG. 1. The arrangement of the passage openings 36*a* of the baffle plates 36 in the upper half of a respective one of such baffle plates 36, as shown in FIG. 2, can be achieved in that these openings 36*a* are not clogged or blocked by the separated-out particles 24. Furthermore, it is preferred that these openings 36*a* of every two adjacent baffle plates 36 are offset from one another perpendicular to the direction of flow or are not aligned. The result of this is that the venting gas 22 cannot spread in a straight line or cannot simply flow through these openings 36*a* in a straight line without being deflected. On the contrary, this offset arrangement of the openings 36*a* means that the venting gas 22 is deflected several times, as is also shown in FIG. 1. The venting gas 22 thus takes a kind of wavy course. This creates additional swirling, which leads to increased particle separation.

FIG. 3 again shows a part of a gas discharge channel 26 in a plan view in the z-direction according to a further exemplary embodiment of the invention. This gas discharge channel 26 is also formed with the baffle plates 36 described. Moreover, the gas discharge channel 26 can also be designed as already described. The passage openings 36*a* in a respective baffle plate 36 are also illustrated by a dashed line in FIG. 3. As shown, for example, in the example in FIG. 3, the baffle plates 36 can furthermore be oriented as a whole or only partially at an angle which differs from 90 degrees as relates to the x-direction and to the y-direction. This angled design increases the generation of turbulence. This turbulence is also illustrated as an example in FIG. 3 and labeled as 52. It is also possible for a coolant to flow not only through the dividing walls 42 for active cooling, but also, for example, the baffle plates 36 themselves. This enables the cooling efficiency to be increased even further. For example, coolant 48 (cf. FIG. 4) can also flow through regions of the dividing walls 42 and the baffle plates 36 in a meandering manner.

In addition to this design of the particle separation device 28 with such baffle plates 36, the gas discharge channel 26 can also be additionally or alternatively provided with other separation mechanisms, for example a cyclone separator or filter materials or the like. In this case too, for example, parts of such a cyclone separator can then be designed such that a coolant 48 can flow through them. In other words, wall parts of such a cyclone separator can also be designed here as active cooling devices 46.

Overall, the examples show how a battery can be provided with a cooled venting gas particle separator by the invention. It is preferably provided that a separator chamber is integrated within the battery. The venting gas is guided through this separator chamber before it comes into contact with the ambient air. The very hot particles are separated from the gas and at the same time retained in the separator chamber by means of multiple deflections of the gas flow, combined for example with baffle plates, filter materials, centrifuges, and so on. In addition, the battery coolant flows through the separator chamber, or areas thereof, which are made of material that conducts heat well. This can prevent the venting gas from igniting when it comes into contact with atmospheric oxygen due to very hot particles. Furthermore, the venting gas is cooled, slowed down by the associated reduction in volume, and brought below the self-ignition temperature before escaping into the ambient air.

The invention claimed is:

1. A battery housing for an energy storage device, wherein the battery housing has a receiving area for accommodating a battery unit, comprising:

a gas discharge channel integrated into the battery housing, which gas discharge channel has an interior space which is spatially delimited by a channel wall, wherein at least one gas inlet opening and at least one gas outlet opening leading out of the battery housing are arranged in the channel wall, and a gas discharge path is provided from the at least one gas inlet opening to the at least one gas outlet opening, wherein at least one part of the channel wall is designed as a cooling device for cooling a gas-particle mixture flowing through the gas discharge channel;

wherein the gas discharge channel has at least one particle separation device for separating particles from the gas-particle mixture flowing through the gas discharge channel;

wherein the at least one particle separation device comprises at least two baffle plates provided by the channel wall and protruding into the interior space of the gas discharge channel, each baffle plate having at least one passage opening;

wherein the baffle plates divide the interior space of the gas discharge channel into individual segments along the gas discharge path, wherein each individual segment is paired with another, adjacent individual segment, and wherein each pair of segments arranged adjacent each other along the gas discharge path are fluidly coupled to one another through a passage opening in a corresponding one of the at least two baffle plates;

wherein a respective passage opening is located in an upper half of a respective baffle plate with respect to a first direction;

wherein the gas discharge channel has, at least in regions, a longitudinal extension in a second direction which is perpendicular to the first direction, and wherein a third direction is defined perpendicular to the first and second directions, wherein the at least two baffle plates include adjacent baffle plates that are adjacent to one another in the second direction, and wherein passage openings of the adjacent baffle plates are arranged offset in relation to one another in the third direction;

wherein the gas discharge channel comprises multiple windings and is deflected from extending in the second direction to extending opposite the second direction such that the gas discharge channel extends in a serpentine manner with respect to a main extension direction of the gas discharge channel;

wherein the baffle plates are at least partly arranged at an angle other than 90 degrees with respect to the second and third directions to impart a swirling flow to the gas-particle mixture along the gas discharge path such that particles are separated from the gas-particle mixture by centrifugal forces;

wherein the channel wall comprises a lateral dividing wall that separates the receiving area from the interior space of the gas discharge channel; and wherein a coolant is configured to flow in a meandering manner through regions of the lateral dividing wall and through regions of at least one of the at least two baffle plates.

2. An energy storage device for a motor vehicle, which energy storage device has a battery housing according to claim 1.

* * * * *